US011751028B2

(12) United States Patent
Reimann et al.

(10) Patent No.: US 11,751,028 B2
(45) Date of Patent: Sep. 5, 2023

(54) METHOD FOR PREDICTING CHANNEL LOAD

(71) Applicant: VOLKSWAGEN AKTIENGESELLSCHAFT, Wolfsburg (DE)

(72) Inventors: Daniel Reimann, Braunschweig (DE); Guillaume Jornod, Berlin (DE); Andreas Pfadler, Berlin (DE)

(73) Assignee: Volkswagen Aktiengesellschaft

( * ) Notice: Subject to any disclaimer, the term of this patent is extended or adjusted under 35 U.S.C. 154(b) by 133 days.

(21) Appl. No.: 17/428,652

(22) PCT Filed: Feb. 18, 2020

(86) PCT No.: PCT/EP2020/054179
§ 371 (c)(1),
(2) Date: Aug. 5, 2021

(87) PCT Pub. No.: WO2020/169568
PCT Pub. Date: Aug. 27, 2020

(65) Prior Publication Data
US 2022/0131805 A1  Apr. 28, 2022

(30) Foreign Application Priority Data

Feb. 20, 2019  (EP) .................................... 19158381
Apr. 29, 2019  (EP) .................................... 19171569
Jan. 30, 2020  (EP) .................................... 20154605

(51) Int. Cl.
*H04W 4/46* (2018.01)
*H04L 43/0882* (2022.01)
(Continued)

(52) U.S. Cl.
CPC ............ *H04W 4/46* (2018.02); *G08G 1/0112* (2013.01); *G08G 1/0125* (2013.01);
(Continued)

(58) Field of Classification Search
CPC ....... H04W 4/46; H04W 4/40; H04W 72/542; H04W 4/023; H04W 4/027; H04W 16/28;
(Continued)

(56) References Cited

U.S. PATENT DOCUMENTS 7,546,182 B2   6/2009  Mudalige
8,922,390 B2  12/2014  Stählin et al.
(Continued)

FOREIGN PATENT DOCUMENTS

CN    101031161 A    9/2007
CN    102421142 A    4/2012
(Continued)

OTHER PUBLICATIONS

European Patent Application No. 19158381.4; Feb. 20, 2019.
(Continued)

*Primary Examiner* — Ajay Cattungal
(74) *Attorney, Agent, or Firm* — BARNES & THORNBURG, LLP

(57) ABSTRACT

A method of a first transportation vehicle for predicting channel load. The first transportation vehicle predicts a critical area with channel congestion of at least one communication channel, determines a propagation trajectory of at least one second transportation vehicle and compares the propagation trajectory of the at least one second transportation vehicle and the critical area. Based on the comparison, the first transportation vehicle then selectively transmits a message having information on the critical area to at least one second transportation vehicle. Also disclosed is a transportation vehicle for performing the method and a computer program having instructions for performing the method.

28 Claims, 2 Drawing Sheets

(51) Int. Cl.

| | |
|---|---|
| H04W 24/08 | (2009.01) |
| H04W 28/02 | (2009.01) |
| H04B 17/373 | (2015.01) |
| H04W 4/40 | (2018.01) |
| H04B 7/0413 | (2017.01) |
| H04B 7/06 | (2006.01) |
| H04B 7/08 | (2006.01) |
| H04L 1/00 | (2006.01) |
| H04W 4/02 | (2018.01) |
| H04W 16/28 | (2009.01) |
| H04W 24/10 | (2009.01) |
| H04W 64/00 | (2009.01) |
| G08G 1/01 | (2006.01) |
| G08G 1/056 | (2006.01) |
| H04L 47/127 | (2022.01) |
| H04W 72/542 | (2023.01) |

(52) U.S. Cl.
CPC .......... *G08G 1/0145* (2013.01); *G08G 1/056* (2013.01); *H04B 7/0413* (2013.01); *H04B 7/0626* (2013.01); *H04B 7/086* (2013.01); *H04B 17/373* (2015.01); *H04L 1/0026* (2013.01); *H04L 43/0882* (2013.01); *H04L 47/127* (2013.01); *H04W 4/023* (2013.01); *H04W 4/027* (2013.01); *H04W 4/40* (2018.02); *H04W 16/28* (2013.01); *H04W 24/08* (2013.01); *H04W 24/10* (2013.01); *H04W 28/0273* (2013.01); *H04W 28/0284* (2013.01); *H04W 64/006* (2013.01); *H04W 72/542* (2023.01)

(58) Field of Classification Search
CPC ......... H04W 28/0273; H04W 28/0284; H04W 64/006; H04B 17/373; H04B 7/0413; H04B 7/0626; H04B 7/086; G08G 1/0112; G08G 1/0125; G08G 1/0145; G08G 1/056; H04L 7/0413; H04L 7/0626; H04L 7/086; H04L 1/0026; H04L 43/0882; H04L 47/127
See application file for complete search history.

(56) References Cited

U.S. PATENT DOCUMENTS

| | | | |
|---|---|---|---|
| 9,888,396 B2 | 2/2018 | Wilhelm et al. | |
| 10,015,289 B2 | 7/2018 | Bosch et al. | |
| 10,154,419 B2 | 12/2018 | Ekiz et al. | |
| 10,455,367 B2 | 10/2019 | Calabuig Gaspar et al. | |
| 11,395,298 B2 | 7/2022 | Kang et al. | |
| 2012/0003921 A1 | 1/2012 | Scopigno et al. | |
| 2014/0092735 A1 | 4/2014 | Lee et al. | |
| 2015/0032289 A1* | 1/2015 | Lotz | G08G 1/163 701/1 |
| 2016/0321919 A1* | 11/2016 | Xu | H04W 4/027 |
| 2017/0041760 A1 | 2/2017 | Alieiev et al. | |
| 2017/0116852 A1* | 4/2017 | Xu | H04B 1/3822 |
| 2018/0295474 A1 | 10/2018 | Lee et al. | |
| 2018/0359713 A1* | 12/2018 | Boban | H04W 64/00 |
| 2019/0039627 A1* | 2/2019 | Yamamoto | B60W 60/0053 |
| 2019/0043347 A1* | 2/2019 | Biehle | G08G 1/096716 |
| 2019/0245647 A1 | 8/2019 | Alieiev et al. | |
| 2019/0335397 A1* | 10/2019 | Ganesan | H04W 52/0235 |
| 2020/0280827 A1* | 9/2020 | Fechtel | H04W 80/02 |
| 2021/0053570 A1* | 2/2021 | Akella | G05D 1/0088 |
| 2021/0258869 A1* | 8/2021 | Di Girolamo | H04W 48/18 |

FOREIGN PATENT DOCUMENTS

| | | |
|---|---|---|
| CN | 103125109 A | 5/2013 |
| CN | 103813386 A | 5/2014 |
| CN | 105376795 A | 3/2016 |
| CN | 106471826 A | 3/2017 |
| CN | 106506386 A | 3/2017 |
| CN | 107040959 A | 8/2017 |
| CN | 107071855 A | 8/2017 |
| CN | 108269395 A | 7/2018 |
| DE | 102014212989 A1 | 1/2016 |
| DE | 102016226050 A1 | 6/2018 |
| DE | 102017108428 A1 | 10/2018 |
| DE | 102017010969 B3 | 2/2019 |
| EP | 3598413 A1 | 1/2020 |
| JP | 2005150848 A | 6/2005 |
| JP | 2017175296 A | 9/2017 |
| JP | 2018174594 A | 11/2018 |
| WO | 2017045139 A1 | 3/2017 |
| WO | 2017052690 A1 | 3/2017 |
| WO | 2018019394 A1 | 2/2018 |
| WO | 2018111177 A1 | 6/2018 |
| WO | 2018190604 A1 | 10/2018 |

OTHER PUBLICATIONS

3GPP TSG RAN WG1 Meeting #86bis; Congestion control for V2V; Oct. 10-14, 2016; Lisbon, Portugal.
Awang et al.; Routing in Vehicular Ad-hoc Networks: A Survey on Single- and Cross-Layer Design Techniques, and Perspectives; IEEE; Special Section on Resource Management in Vehicular Ad-hoc Networks: Energy Management, Communication Protocol and Future Applications; Apr. 7, 2017.
Search Report for European Patent Application No. 20154605.8; dated Apr. 7, 2020.
Search Report for International Patent Application No. PCT/EP2020/054179; dated Apr. 7, 2020.
European Patent Application No. 18184352.5; Jul. 19, 2018.
Office Action; Japanese Patent Application No. 2021-549151; dated Sep. 6, 2022.
Search Report; European Patent Application No. 20152152.3; dated Apr. 7, 2020.
Search Report; International Patent Application No. PCT/EP2020/054180; dated Apr. 7, 2020.
Office Action; Chinese Patent Application No. 202080015764.1; dated Sep. 5, 2022.

* cited by examiner

METHOD FOR PREDICTING CHANNEL LOAD

PRIORITY CLAIM

This patent application is a U.S. National Phase of International Patent Application No. PCT/EP2020/054179, filed 18 Feb. 2020, which claims priority to European Patent Application Nos. 19158381.4, filed 20 Feb. 2019; 19171569.7, filed 29 Apr. 2019; and 20154605.8, filed 30 Jan. 2020, the disclosures of which are incorporated herein by reference in their entireties.

SUMMARY

Illustrative embodiments relate to a method for predicting channel load, particularly for predicting channel load of at least one communication channel in a region based on traffic flow data for the region. Illustrative embodiments further relate to a transportation vehicle configured for performing such method, particularly to a transportation vehicle comprising a control unit configured for performing such method. Illustrative embodiments further relate to a computer program for enabling a control unit to perform the disclosed method.

BRIEF DESCRIPTION OF THE DRAWINGS

Disclosed embodiments are described in detail with reference to the attached drawings in which.

DETAILED DESCRIPTION

Figure 1:
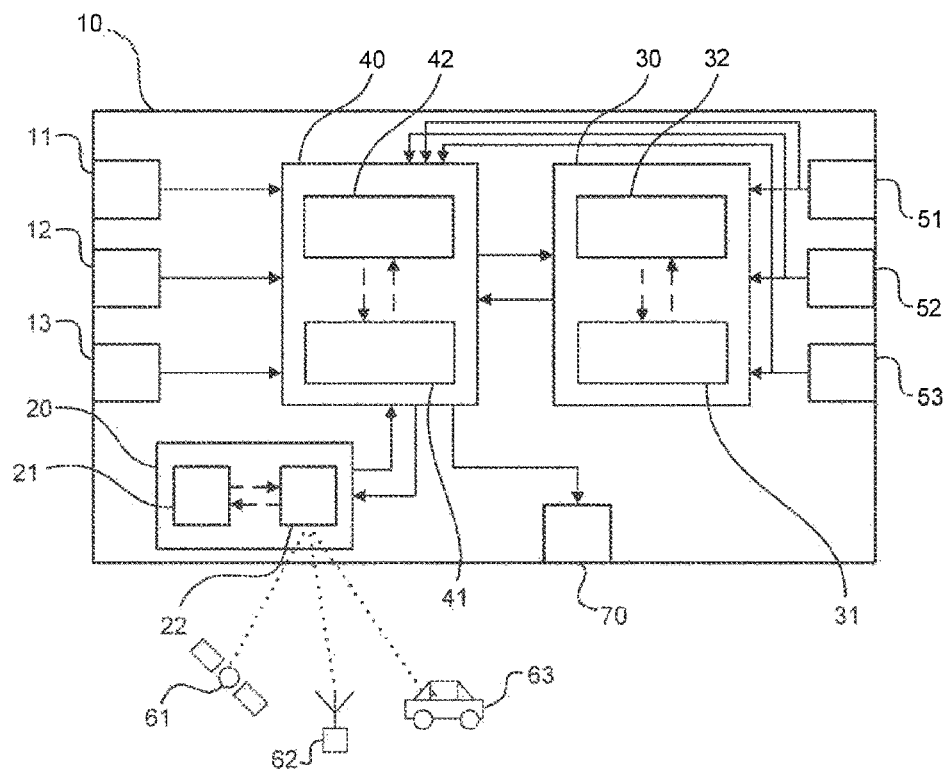
FIG. 1 schematically illustrates a transportation vehicle for performing the disclosed method.

Automotive applications and mobile communications become more and more entangled, particularly due to the increasing interest in autonomous driving that requires larger amounts of data when compared to conventional driving. These data amounts are provided partially by the transportation vehicle itself (i.e., by sensors thereof) and partially via an air interface. Via the air interface either a vehicle to vehicle, V2V, communication or a vehicle to everything, V2X, communication is carried out, the latter including communication with road side units, RSUs. Therein, V2V and V2X communication can be carried out either as point-to-point (unicast) communication or as point-to-multipoint (multicast/broadcast) communication.

Where V2X communication is carried out via a cellular mobile network, such as, e.g., a LTE or 5G communication network, it is referred to as cellular-V2X, C-V2X. The V2V and C-V2X communications can be carried out in a LTE or 5G network with sidelink carries at the PHY layer (PC5 sidelink) or based on WLAN communication according to IEEE 802.11p standard.

With an increasing amount of modern transportation vehicles using V2V and V2X communication, the number of users of these communication protocols is on the rise. Due to the user numbers and increasingly complex applications, the amount of transmitted data will rise continuously. However, due to limited bandwidth and data rate the increase in data might come along with a deterioration of channel quality and thus quality of service, QoS, of communication links.

However, particularly with respect to autonomous driving the QoS of the radio links might be directly related to the safety of the automated processes and hence the driver's safety. An example can be found in so-called "platooning", which is a cooperative driving maneuver that shall allow the participating transportation vehicles to form a high-density convoy with minimal spacing for reducing energy and fuel consumption of the individual transportation vehicles. In such platooning, a platoon leader might need to inform other platoon members of a required braking operation or the like via a unicast message. If such message is transmitted in a poor channel quality environment, the transmission might be prone to errors or delays causing decreased performance and risk.

From prior art it is known that a elements of a mobile communication network, such as, e.g., base stations of a mobile communication network (eNB in 4G), communicate with a plurality of transportation vehicles to predict a shortage in communication resources based on route information received from the transportation vehicles. If such shortage in communication resources is detected, the base station can inform the transportation vehicles for them to change their route or the base station can re-schedule data transmission or hand over data bearers to neighboring cells. However, the known prior art method require heavy signaling themselves and hence their performance itself contributes to a shortage of communication resources.

Disclosed embodiments overcome or reduce at least some of the drawbacks of the prior art and to provide a method for predicting channel load that allows for the adaption of the driving operation of automatic transportation vehicles based on a predicted channel load, while avoiding a shortage of communication resources based on the method itself.

According to exemplary embodiments of the present disclosure, a method for predicting channel load is provided that can be performed by a first transportation vehicle as described below. In a first operation of the method, the first transportation vehicle predicts a critical area that is defined by having a channel congestion of at least one communication channel provided in the area. The communication channel may be a data bearer of at least one access point providing mobile communication services in the area, such as, e.g., a base station of a mobile communication network (4G, 5G) or a road side unit for V2X communication (IEEE 802.11p).

In the critical area a data transport via the data bearer cannot be reliably provided, i.e., a data communication over the data bearer is prone to be faulty and/or delayed. In the context of the present disclosure, the criticality of the data communication in the critical area is based due to excess communication requirements, i.e., due to an amount of communication requests exceeding a maximum number of allowable (attainable) communication requests. In the context of the present disclosure, the criticality is not due to a fault of access point hardware.

The critical area may be determined as a geographical area, i.e., based on at least one geographical coordinate. However, the critical area may also be determined related to an access point of a communication channel, e.g., as an identifier of at least one access point such as, e.g., a base station and/or as a coverage area of at least one access point or the like. Further, the critical area may be determined having a temporarily limited criticality. In other words, a geographical area or a coverage area of an access point can be critical at a first time point but may not be critical at a second time point. Hence, the information on the critical area further may comprise information on a time point or period of criticality.

In the method of the present disclosure, further a propagation trajectory of at least one second transportation vehicle is predicted. Therein, the predicted propagation trajectory may comprise at least one predicted velocity and at least one predicted propagation direction of the at least one second transportation vehicle. Additionally or alternatively, the predicted propagation trajectory may further comprise at least one predicted coordinate for the at least one second transportation vehicle. Therein, predicted information refers to information associated with at least one future time point and hence comprises spatial information as well as temporal information.

In a disclosed embodiment, the propagation trajectory is predicted based on an actual propagation trajectory, i.e., an actual velocity and a propagation direction of the at least one second transportation vehicle. Additionally or alternatively, the propagation direction is predicted based on route information or destination information of the at least one second transportation vehicle. Detailed description how a propagation trajectory of a second transportation vehicle can be predicted is given below.

The predicted propagation trajectory of the at least one second transportation vehicle is then compared with the critical area predicted by the first transportation vehicle. Such comparison may comprise the determination of a correlation with the predicted propagation trajectory and the predicted critical area. Exemplarily, such correlation is due to a spatiotemporal overlap of the predicted propagation trajectory and critical area. However, a correlation may also be due to spatiotemporal proximity between the predicted propagation trajectory and critical area, e.g., based on that the predicted trajectory passes the critical area with less than a predetermined minimal distance or crosses the critical area close to a determined time period of criticality. While a spatial extend of a critical area might reliably predicted, the prediction of a time period of criticality might be prone to have rather large uncertainty intervals around a respective start and end point. Optionally, the determined correlation between the propagation trajectory and the critical area may be a measure of a probability that a second transportation vehicle corresponding to the predicted trajectory is within or at least nearby the critical area at the time of criticality.

In a last operation of the method of the present disclosure, a message comprising information on the critical area is selectively transmitted to at least one second transportation vehicle based on the comparison. Therein, the message may comprise information on the spatial extend of the critical area as well as on the time period of criticality of the critical area. Further, the message may comprise information on a level of criticality, i.e., on a level of channel congestion in the critical area. This information may comprise channel quality information, CQI, or information on a Quality of Service, QoS, that can be provided in the critical area.

According to the method of the present disclosure, the message is transmitted to second transportation vehicles only if the comparison of the critical area with the predicted trajectory of that second transportation vehicle yields a probability that a second transportation vehicle corresponding to the predicted trajectory is within or at least nearby the critical area at the time of criticality which exceeds a predetermined threshold. In other words, only if the second transportation vehicle can be reasonably expected to be within or nearby the critical area at the time of criticality, the message comprising information on the critical area is transmitted to that second transportation vehicle. Hence, the transmission of unnecessary messages on the critical area is effectively avoided in the method of the present disclosure and hence a method for predicting channel load and avoiding channel congestion does not contribute to channel congestion itself.

Further, the second transportation vehicle receiving the message is beneficially informed about the critical area and can thus beneficially adapt its automatic driving applications with respect to the critical area. In a disclosed embodiment of the method, the message is broadcasted only within a predetermined transmission range (i.e., transmission power) around the critical area. In other words, the message about the critical area is only shared in a predefined range around the critical area to further reduce the channel congestion. Further, the transmitting of the message is also only initiated within a predetermined distance around the location to further reduce channel congestion.

Optionally, the channel congestion of at least one communication channel in the critical area corresponds to channel quality information, CQI, below a predetermined first threshold. Therein, CQI may relate to information on an error rate of the communication, such as, e.g., a packet error loss rate or a bit error rate. The channel quality information, CQI, may further be configured similarly to a Quality of Service (QoS) Class Identifier, QCI, or a channel quality indicator, CQI, according to LTE-A but is however not limited to such an exemplary embodiment. Further, the channel congestion of at least one communication channel in the critical area corresponds to a channel load above a predetermined second threshold. Therein, the channel load may be determined as the ratio of an actual available bandwidth and a theoretical bandwidth of the communication channel. The first and/or second threshold may be defined by a network operator, i.e., generally as a measure of an unfaulty operation of the network (access point), or may be individually defined for at least one second transportation vehicle, i.e., under special consideration of the communication demands of the second transportation vehicle (e.g., a fully automatic transportation vehicle may have a higher threshold than a semi-automatic transportation vehicle). Further, the first and/or second threshold may be defined by the second transportation vehicle itself, e.g., based on a past data consumption or a predicted data consumption of the at least one second transportation vehicle.

In a disclosed embodiment of the method, the operation of predicting a critical area comprises determining a high density area that contains more than a predetermined number of transportation vehicles. In other words, the criticality of an area is related to a predicted amount of users of the communication channel in that area. If the access point providing the communication channel in the critical area is a road side unit providing dedicated services for transportation vehicles, a high density area may be solely determined based on an amount of transportation vehicles. However, if an access point providing the communication channel in the critical area is a base station of an all-purpose mobile communication network, a high density area may be determined as an area than contains more than a predetermined number of transportation vehicles and other users. Therein, other users may be connected to the communication channel with user equipment such as smartphones, tablets or the like. A prediction of other users is not part of the present disclosure, however an actual number of users may be considered in prediction a critical area. Further, the predetermined number of transportation vehicles may be set variably based on an actual number of other users. Above that, the predetermined number of transportation vehicles may be chosen by a network operator or a transportation vehicle manufacturer, e.g., based on collected empirical data.

In an exemplary embodiment of the disclosed method, the operation of predicting a high density area comprises predicting traffic flow data associated with a plurality of second transportation vehicles. Therein, the traffic flow data is based on trajectory information for a plurality of second transportation vehicles and allows estimating (determining) traffic situations created by the plurality of second transportation vehicles. In the context of the present disclosure, a traffic situation is mainly characterized by an amount of second transportation vehicles located nearby or in an area within a certain time window. However, a traffic situation may consider additional embodiments described below.

With respect to an area, the traffic flow data may characterize a first number of transportation vehicles that is approaching the area within a certain time window and a second number of transportation vehicles that is departing from the location within a certain time window. Based on such numbers, i.e., based on an inflow and an outflow of transportation vehicles, a change of a total of number of transportation vehicles associated with the area and time window can be determined based on a continuity equation of the area.

Further, the traffic flow data is based on trajectory information of the second transportation vehicles. Therein, trajectory information may comprise information as described above with respect to the predicted trajectory information. Particularly, the trajectory information is obtained via sensor readings of the first transportation vehicle. Such sensor readings may be obtained by sensors of the first transportation vehicle as usually employed for distance measurements in transportation vehicles, such as, e.g., LIDAR, ultrasound or laser distance sensors. Based on such sensor readings, actual velocities and propagation directions of second transportation vehicles can be obtained and used for determining traffic flow data associated with the second transportation vehicles.

Alternatively, the trajectory information of the second transportation vehicles is obtained from at least one message transmitted by a second transportation vehicle and received by the first transportation vehicle. Such messages can be unicasted or broadcasted by the second transportation vehicles and may comprise route information or destination information derived from a navigation application of the second transportation vehicle. Further, such messages may comprise information on an actual velocity and propagation direction and even information on velocity and propagation direction predicted by the second transportation vehicle itself. Particularly, the at least one message is at least one cooperative awareness message, CAM, transmitted by at least one second transportation vehicle. Such CAM comprises information on the location and propagation direction of the transportation vehicle and thus allows predicting the future whereabouts of the transmitting transportation vehicle. Hence, traffic flow prediction can even be accomplished without performing actual sensor readings, which is beneficial in bad measurement conditions such as heavy rain, fog or snow. The information contained in CAM messages may be based on data obtained by the transmitting transportation vehicle itself, such as, e.g., GPS coordinates and traveling trajectories, velocity, etc. Particularly, sensor readings are combined with received CAM information to predict the traffic flow data in the method of the present disclosure with high precision.

According to a further disclosed embodiment of the method, the high density area comprising more than a predetermined number of transportation vehicles is determined based on road information and/or traffic information obtained by the first transportation vehicle. Optionally, the road and/or traffic information are considered in addition to the traffic flow data obtained by the first transportation vehicle.

Particularly, the road information comprises static information that is related to an area and that may further characterize the infrastructure at the location. Exemplarily, such road information specifies that the location is an intersection (with or without traffic lights), a pedestrian crossing (with or without traffic lights) or a railway crossing (with or without gates). Further, such road information comprise additional data, such as, e.g., on switching times of a traffic light, on closing times of a gate at a railway crossing, crossing times of trains at a railway crossing, or the like. Further, the road information is obtained based on sensor readings of the first transportation vehicle, i.e., based on data the first transportation vehicle obtained while driving along roads. Further, such road information is derived from navigation information present in a transportation vehicle or the road information is obtained by the first transportation vehicle from at least one message received from at least one second transportation vehicle Further, the traffic information comprises dynamic information related to an area, which may further specify an actual traffic scenario within or nearby the area. Exemplarily, the traffic information specify that a traffic jam is occurring within or nearby the area, that an accident occurred within or nearby the area or that a road block or closure is occurring for another reason within or nearby the area. The traffic information is thus particularly suitable for considering a dwelling time of transportation vehicles within or nearby the area or by considering obstructions that prevent a flow of transportation vehicles out of the area. The traffic information may be also obtained by sensor readings of the first transportation vehicle, i.e., based on data the first transportation vehicle obtained while driving along roads. Alternatively, the traffic information is obtained from at least one message received by the first transportation vehicle. Therein, such messages may be transmitted by a second transportation vehicle, by a traffic information service, by a radio station, or the like.

As already set forth above with respect to the critical area, also the high density area may be defined by a geographic coordinate and an area around the coordinate. Based on such geographic definition of a high density area, a definition of the high density area related to an access point of a communication channel can be determined, e.g., based on an identifier of at least one access point (base station) or on a coverage area of the access point. Further, the high density area is defined based on an identifier of at least one second transportation vehicle that is associated with the high density area. In general, a high density area is prone to be generated by moving clusters of second transportation vehicles and can become a critical area if the second transportation vehicles are using a same communication network infrastructure. Such moving high density area can be associated with the positions of second transportation vehicles and by knowing the identifiers of these second transportation vehicles, their actual positions can be reliably determined.

Further, the operation of predicting a critical area comprises the operation of determining a number of transportation vehicles in an area, optionally in a high density area, and then determining a channel load of a communication channel based on a predetermined channel load per vehicle of the transportation vehicles located in the area. In other words, the number of transportation vehicles that is determined actually refers to a number of transportation vehicles using a same communication channel, e.g., by accessing a communication network via the same access point such as a base station.

In the above exemplary embodiment, channel usage may refer to a fraction of communication bandwidth of a channel that is occupied by a single transportation vehicle using that channel. Therein, the channel usage per transportation vehicle may be individually adapted for an individual transportation vehicle or for a class of transportation vehicles. Exemplarily, a channel usage per transportation vehicle may be determined for a group of transportation vehicles based on a class of the transportation vehicles of that group, wherein, e.g., travel coaches are set to have a higher data usage than a conventional passenger car. An individual adaption of the channel usage per transportation vehicle may be based on a transmission history or data usage history of that individual transportation vehicle. Such history information may be received by the first transportation vehicle via at least one messages received from at least one second transportation vehicle. That is, such individual adaption may be carried out in a traffic flow prediction which itself is based on messages received from at least ones second transportation vehicle by the first transportation vehicle. Further, messages received from a second transportation vehicle by the first transportation vehicle may be used for determining a propagation direction of the second transportation vehicle and for predicting a high density area (i.e., a critical area).

Particularly, the operation of selectively transmitting the message further comprises the operations of determining whether the propagation information of at least one second transportation vehicle indicates a presence in the critical area at a time of criticality and transmitting the message to at least one second transportation vehicle present in the critical area at a time of criticality. Also the operation of selectively transmitting the message may comprise the operation of not transmitting the message to at least one second transportation vehicle not present in the critical area at a time of criticality.

In a further disclosed embodiment, the message on the critical area is a shared channel quality, SCQ, message configured to inform transportation vehicles that will pass a critical area with high channel load as described in detail in European patent application No. 19158381.4, the full content of which is hereby incorporated by reference. Further, the first message and/or the second message is a cooperative communication message, CCM, configured to comprise information on a channel as well as on surrounding structures that might have an impact on the channel quality as described in detail in European patent application No. 18184352.5, the full content of which is hereby incorporated by reference. However, for the method of the disclosure, the format for transmitting the second CQI is rather irrelevant.

Another facet of the present disclosure relates to a transportation vehicle comprising a communication module that is configured to communicate with another transportation vehicle and with at least one station of a communication network. The communication module may comprise further components to enable such communication with another transportation vehicle (i.e., an identical or similar communication module of another transportation vehicle) in the mobile communication system. Such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. These components may further be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a (uniform) field array, etc.

The transportation vehicle of the present disclosure further comprises a plurality of first sensors that are configured for detecting a propagation direction and/or velocity of at least one other transportation vehicle, optionally of a plurality of other transportation vehicles. These sensors may be configured as common in the field for detecting distances between a transportation vehicles and another transportation vehicle or obstacles, e.g., by utilizing LIDAR technology, RADAR technology, ultrasound sensors or laser-based sensors. In addition to the sensors, the communication module of the transportation vehicle may be further configured to receive a (CAM) message from at least one other transportation vehicle that comprises various information, such as information on a propagation direction and/or velocity of that transportation vehicle. The transportation vehicle may further comprises second sensors that are configured for detecting at least one value that is associated with a state of the transportation vehicle itself, e.g., the velocity or propagation direction of the transportation vehicle or the like. The communication module may further be configured for transmitting a (CAM) message comprising such information.

The disclosed transportation vehicle further comprises a control unit that is connected to the communication module, particularly via respective interfaces, and that is configured to control the communication module to receive and transmit respective data. The control unit is particularly configured to predict a critical area with channel congestion of at least one communication channel, to determine a propagation trajectory of at least one second transportation vehicle to compare the propagation trajectory of the at least one second transportation vehicle and the critical area, and to selectively transmit a message comprising information on the critical area to at least one second transportation vehicle based on the comparison. Exemplary embodiments of the disclosed transportation vehicle correspond to exemplary embodiments of the disclosed method.

Another disclosed embodiment relates to a computer program comprising instructions which, when the program is executed by a control unit of a transportation vehicle, cause the control unit to carry out a method for predicting channel load as set forth above.

Reference will now be made in detail to exemplary embodiments which are illustrated in the drawings. Effects and features of the exemplary embodiments will be described with reference to the accompanying drawings. Therein, like reference numerals denote like elements, and redundant descriptions are omitted. The present disclosure, however, may be embodied in various different forms, and should not be construed as being limited to only the illustrated embodiments herein. Rather, these disclosed embodiments are provided solely as examples for fully conveying the embodiments and features of the present disclosure to those skilled in the art.

Accordingly, processes, elements, and techniques that are not considered necessary to those having ordinary skill in the art for a complete understanding of the embodiments and features of the present disclosure may not be described. At the same time, within the drawings, the relative sizes of elements, layers, and regions may be exaggerated for clarity.

As used herein, the term "and/or" includes any and all combinations of one or more of the associated listed items. Further, the use of "may" when describing exemplary embodiments refers to "one or more disclosed embodiments." Further, in the following description of exemplary embodiments of the present disclosure, the terms of a singular form may include plural forms unless the context clearly indicates otherwise.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present disclosure. As used herein, the term "and/or" includes any and all combinations of one or more of the associated listed items and expressions such as "at least one of" when preceding a list of elements, modify the entire list of elements.

As used herein, term as "substantially", and "about" are used as terms of approximation and not as terms of degree, and are intended to account for the inherent deviations in measured or calculated values that would be recognized by those of ordinary skill in the art. However, if the term "substantially" is used in combination with a feature expressed using a numeric value, the term "substantially" denotes a range of +/−5% of the value centered on the value.

FIG. 1 schematically illustrates an exemplary transportation vehicle 10, particularly a transportation vehicle with combustion, electric or hybrid motor. The transportation vehicle 10 comprises a multiple primary sensors, particularly a first sensor 11, a second sensor 12, and a third sensor 13. The primary sensors 11, 12, 13 are configured for detecting environmental information of the transportation vehicle and comprise, e.g., a camera for detecting images of a road upfront the transportation vehicle 10, distance sensors, such as, e.g., ultrasound-based sensors or LIDAR-based sensors, etc. The primary sensors 11, 12, 13 transmit the detected signals to a control unit 40 of the transportation vehicle 10.

The transportation vehicle 10 further comprises a plurality of secondary sensors, particularly a fourth sensor 51, a fifth sensor 52, and a sixth sensor 53. The secondary sensors 51, 52, 53 are configured for detecting information regarding the transportation vehicle 10 itself, particularly data regrading an actual position and motion state of the transportation vehicle 10. The secondary sensors 51, 52, 53 thus optionally comprise velocity sensors, acceleration sensors, tilt sensors, or the like. The secondary signals transmit the detected signals to the control unit 40 of the transportation vehicle 10.

The transportation vehicle 10 further comprises a communication module 20 with a memory and one or more transponders 22. The transponders 22 might be configured as radio, WLAN, GPS and/or BLUETOOTH® transponder or the like. The communication module 20 is configured to communicate, via the transponders 22, with a GPS satellite 61, a base station 62 of a mobile communication network and with at least one second transportation vehicle 63. The transponder 22 communicates with an internal memory 21 of the communication module via a suitable data bus. The communication module 20 is configured to perform V2V and (C-)V2X. The communication module 20 also communicates with the control unit 40. The communication module 20 is adapted for communicating messages according to the WLAN p communication system (IEEE 802.11p) and/or according to a LTE-V mode 4 communication system.

The transportation vehicle 10 further comprises a driving system 30 that is configured for performing fully or partially autonomous driving of the transportation vehicle 10, particularly for longitudinal and lateral control thereof. The driving system 30 comprises a navigation module 32 that is configured to determine a navigation route between a starting point and an end point input by a user. The driving system further comprises an internal memory 31, e.g., for map material, that communicates with the navigation module 32, e.g., via a suitable data bus. At least part of the secondary sensors 51, 52, 53 transmit their signals directly to the driving system 30, particularly including the actual position and movement information of the transportation vehicle 10.

The transportation vehicle further comprises a control unit 40 that is configured for performing the disclosed method as set forth in detail below. For performing this task and others the control unit 40 comprises an internal memory 41 and a CPU 42 that communicate with each other via a suitable data bus. Above that the control unit communicates with at least the primary sensors 11, 12, 13, the secondary sensors 51, 52, 53, the communication module 20 and the driving system 30, e.g., via one or more CAN, SPI, or other suitable connections.

Figure 2:
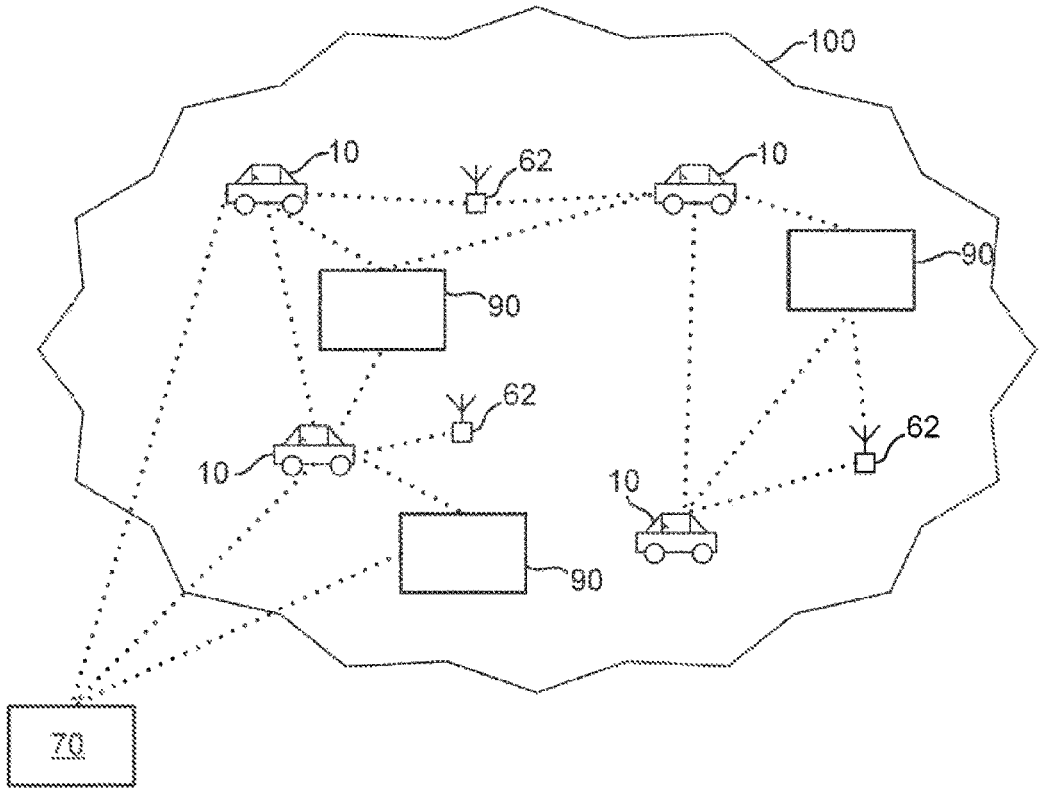
FIG. 2 schematically illustrates a smart environment for performing the disclosed method comprising the transportation vehicles of FIG. 1, base stations of a mobile communication network and road side units (RSUs)

FIG. 2 schematically illustrates a smart environment for performing the disclosed method comprising transportation vehicles as of FIG. 1, base stations 62 of a mobile communication network and a server 70 and road side units, RSUs, 90 operated by a transportation vehicle manufacturer.

In the system as shown in FIG. 2 communication, i.e., transmission, reception or both, takes place among transportation vehicles 10 directly and/or between transportation vehicles 10 and a network component, particularly a base station 62, a road side unit 90, and/or an application or backend server 70. The communication thus either utilizes a mobile communication system or vehicle-to-vehicle, V2V, communication. Therein, the base stations 62 are usually operated by a network operator of a mobile communication network while the road side units 90 might be operated by a transportation vehicle manufacturer or a service partner thereof. Further, the road side units 90 communicate with the server 70 that can also communicate directly with transportation vehicles 10.

The mobile communication system used for the V2V and/or the V2X communication may, for example, correspond to one of the Third Generation Partnership Project (3GPP)-standardized mobile communication networks, where the term mobile communication system is used synonymously to mobile communication network. The mobile or wireless communication system 400 may correspond to a mobile communication system of the 5th Generation (5G) and may use mm-wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Figure 3:
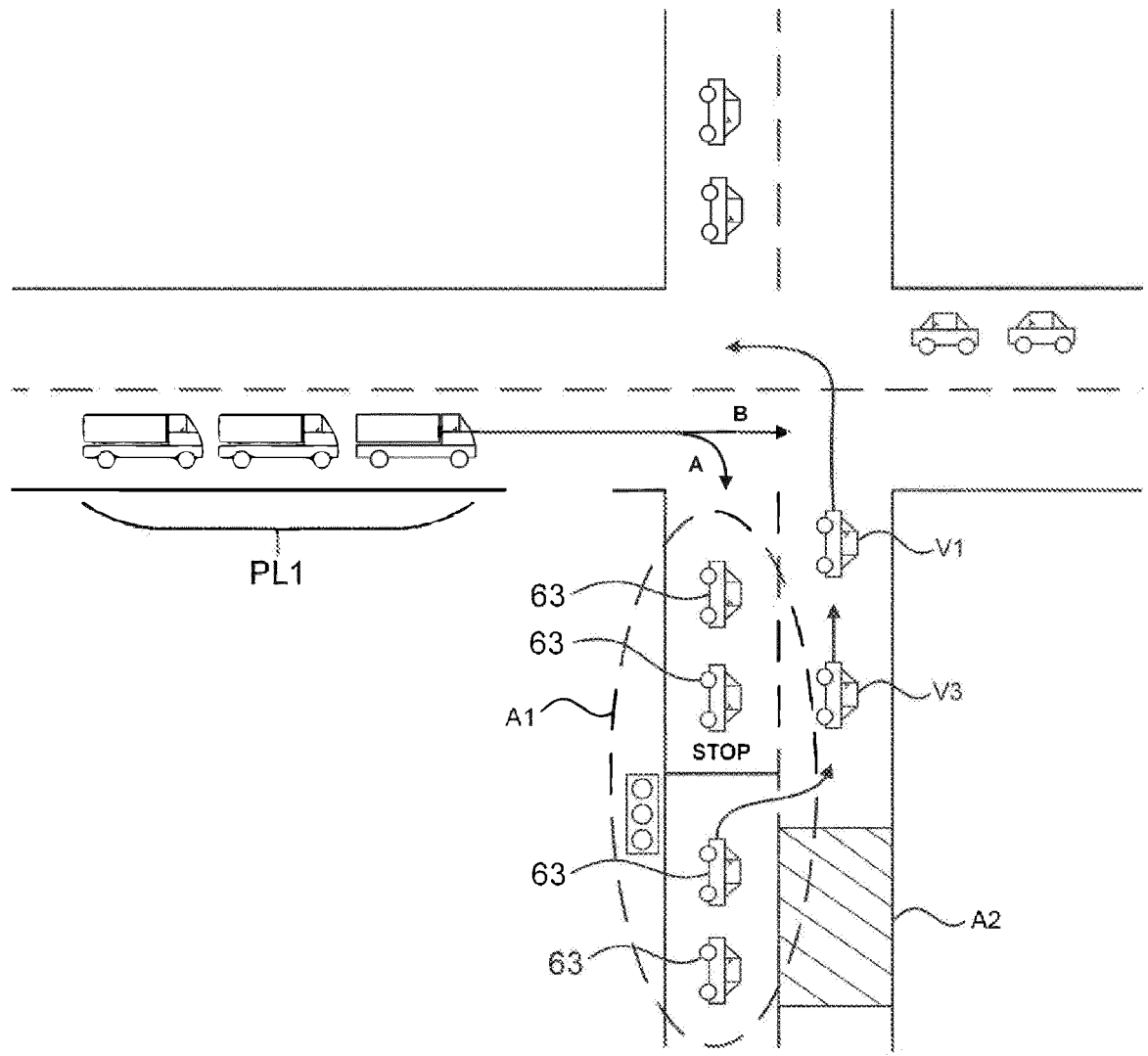
FIG. 3 illustrates an application case of the disclosed methods.

FIG. 3 illustrates an application case of a disclosed method, particularly of a method for predicting channel load according to an exemplary embodiment.

In the situation as illustrated a first passenger transportation vehicle V1 is configured to perform the method of the present disclosure. Therefore, the first transportation vehicle 10, V1 predicts traffic flow data related to a plurality of second transportation vehicles 63 by using sensor readings of built in first sensors 11 to 13 as described above as well as using information received via messages from second transportation vehicles 63. Therein, the messages received from the second transportation vehicles may comprise route information output from a navigation system of the respective second transportation vehicle 63.

Particularly, the first passenger transportation vehicle V1 combines these received route information with sensor readings obtained, while the first passenger transportation vehicle V1 was passing a construction site A2. In the region of the construction site A2 only one driving lane is available and access to the one driving lane is controlled by a traffic light. The first passenger transportation vehicle V1 has knowledge of the switching times of the traffic light and can thus predict a number of transportation vehicles that will be present in an area A1. Based on this predicted number of transportation vehicles, the first passenger transportation vehicle V1 determines the area A1 to be a high density area. Based on this knowledge and the assumption of a certain channel usage per transportation vehicle, the first transportation vehicle determines that area A1 will be a critical area with a channel congestion of at least one communication channel, particularly a channel load of that channel above a predetermined threshold of 70%.

The first passenger transportation vehicle V1 shares this information on the critical area A1 only with those transportation vehicles for which this information is of relevance. Therefore, the first passenger transportation vehicle V1 predicts a propagation trajectory of a plurality of transportation vehicles and compares the predicted propagation trajectory with the critical area A1. Thereby, the first passenger transportation vehicle V1 determines transportation vehicles that drive into the direction of the critical area A1 and thus need to be informed about the predicted channel congestion.

In the scenario as illustrated in FIG. 3, an platoon PL1 comprising three cargo transportation vehicles submits route information to the first passenger transportation vehicle V1 that can thus determine whether the platoon will cross the critical area A1 or not. In a first scenario A, the platoon PL1 will cross the critical area A1 and thus the first passenger transportation vehicle V1 transmits a message on the critical area to the platoon PL1, particularly to a platoon leader. In a scenario B, the platoon PL1 will not cross the critical area A1 and the first passenger transportation vehicle V1 does not transmits a message on area A1 to the platoon PL1.

As further illustrated in FIG. 3, a third passenger transportation vehicle V3 follows the identical route as the first passenger transportation vehicle V1 and hence derives the same prediction of a critical area A1 as the first passenger transportation vehicle V1. Further, the third passenger transportation vehicle V3 is within a transmission range of the first passenger transportation vehicle V1 and its propagation direction indicated a presence in the critical area A1. However, the third passenger transportation vehicle V3 does not again transmit a message on the critical area A1 as such message was already received from the first passenger transportation vehicle V1 which already transmitted the message to the platoon PL1. Based on the reception of the message, the platoon PL1 can thus adapt its automatic driving performance, e.g., by increasing a distance of the cargo transportation vehicles before the arrival at area A1.

The electronic or electric devices and/or any other relevant devices or components according to exemplary embodiments described herein, except those described explicitly as hardware, may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. The electrical connections or interconnections described herein may be realized by wires or conducting elements, e.g., on a PCB or another kind of circuit carrier. The conducting elements may comprise metallization, e.g., surface metallizations and/or pins, and/or may comprise conductive polymers or ceramics. Further electrical energy might be transmitted via wireless connections, e.g., using electromagnetic radiation and/or light. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like.

A person of skill in the art should recognize that the functionality of various computing devices may be combined or integrated into a single computing device, or the functionality of a particular computing device may be distributed across one or more other computing devices without departing from the scope of the exemplary embodiments. Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly defined so.

REFERENCE SIGNS 10 transportation vehicle
11 first sensor
12 second sensor
13 third sensor
20 communication module 21 memory
22 transponder
30 driving system
31 memory
32 CPU
40 control unit
41 memory
42 CPU
51 fourth sensor
52 fifth sensor
53 sixth sensor
61 GPS satellite
62 base station
63 second transportation vehicle
70 backend server
90 road side unit
V1 first passenger transportation vehicle
V3 third passenger transportation vehicle
PL1 first platoon
A1 critical area
A2 construction site

The invention claimed is:

1. A method for a first transportation vehicle predicting communication channel load and for selectively sharing the predicted communication channel load with other transportation vehicles, the method comprising:
   predicting a geographic area as a critical area having predicted channel congestion of at least one communication channel based on determining a number of transportation vehicles in the area during a certain time window;
   determining propagation trajectory information of at least one second transportation vehicle;
   comparing the propagation trajectory information of the at least one second transportation vehicle to the critical area to predict proximity of the at least one second transportation vehicle to the critical area within the time window; and
   selectively transmitting a message comprising information about the critical area to the at least one second transportation vehicle based on the comparison so as to inform only transportation vehicles that drive approach the predicted critical area during the time window about the predicted channel congestion.

2. The method of claim 1, wherein the predicted channel congestion of the at least one communication channel corresponds to channel quality information (CQI) below a predetermined first threshold and/or a channel load above a predetermined second threshold.

3. The method of claim 1, wherein the predicting of the critical area comprises determining the geographic area as a high density area containing more than a predetermined number of transportation vehicles.

4. The method of claim 3, wherein the predicting the high density area comprises predicting traffic flow data associated with a plurality of second transportation vehicles including the at least one second transportation vehicle.

5. The method of claim 4, wherein the traffic flow data prediction is based on trajectory information of the plurality of second transportation vehicles obtained via sensor readings of the first transportation vehicle or based on at least one message transmitted by one of the plurality of second transportation vehicles received by the first transportation vehicle.

6. The method of claim 3, wherein the high density area is determined based on road information and/or traffic information obtained by the first transportation vehicle.

7. The method of claim 6, wherein the road information is obtained based on sensor readings of the first transportation vehicle and/or comprises static information related to the geographic area.

8. The method of claim 6, wherein the traffic information is obtained based on sensor readings of the first transportation vehicle, and/or is obtained from at least one message received by the first transportation vehicle, and/or comprises dynamic information related to the geographic area.

9. The method of claim 3, wherein the high density area is defined by a geographic coordinate and an area around the geographic coordinate, and/or by an identifier of at least one second transportation vehicle associated with the high density area.

10. The method of claim 1, wherein the predicting the critical area comprises determining channel load in the area based on a predetermined channel load per transportation vehicle located in the geographic area.

11. The method of claim 10, wherein the channel load per transportation vehicle is determined based on a vehicle class and/or on a channel usage history of the particular transportation vehicle.

12. The method of claim 1, further comprising determining whether the propagation trajectory information of the at least one second transportation vehicle indicates a presence in the critical area at a time of criticality, wherein the selective transmission of the message comprising information about the critical area to the at least one second transportation vehicle only transmits the message to at least one second transportation vehicle present in the critical area at a time of criticality, thereby not transmitting the message to at least one second transportation vehicle not present in the critical area at a time of criticality.

13. The method of claim 1, wherein the message is a shared channel quality (SCQ) message or a cooperative communication message (CCM).

14. The method of claim 1, wherein the prediction of a geographic area as a critical area includes using a continuity equation to take into consideration a total number of transportation vehicles associated with the geographic area and time window based on an inflow and an outflow of transportation vehicles.

15. The method of claim 1, wherein the propagation trajectory information is obtained via sensor readings of the first transportation vehicle.

16. The method of claim 15, wherein the propagation trajectory information includes velocities and propagation directions of second transportation vehicles for use in determining traffic flow data associated with the second transportation vehicles.

17. A transportation vehicle comprising:
   a communication module configured to communicate with another transportation vehicle and with a station of a communication network;
   a plurality of first sensors configured to detect a propagation trajectory of another transportation vehicle; and
   a control unit configured to control prediction of communication channel load and selective sharing of the predicted communication channel load with other transportation vehicles by:
      prediction of a geographic area as a critical area having predicted channel congestion of at least one communication channel based on determination of a number of transportation vehicles in the area during a certain time window,
      determination of propagation trajectory information of at least one second transportation vehicle, comparison of the propagation trajectory information of the at least one second transportation vehicle to the critical area to predict proximity of the at least one second transportation vehicle to the critical area within the time window, and selective transmission of a message comprising information about the critical area to the at least one second transportation vehicle based on the comparison so as to inform only transportation vehicles that drive approach the predicted critical area during the time window about the predicted channel congestion.

18. The transportation vehicle of claim 17, wherein the prediction of a geographic area as a critical area includes using a continuity equation to take into consideration a total number of transportation vehicles associated with the geographic area and time window based on an inflow and an outflow of transportation vehicles.

19. The transportation vehicle of claim 17, wherein the propagation trajectory information is obtained via sensor readings of the first transportation vehicle.

20. The transportation vehicle of claim 19, wherein the propagation trajectory information includes velocities and propagation directions of second transportation vehicles for use in determining traffic flow data associated with the second transportation vehicles.

21. A non-transitory computer readable medium including a computer program comprising instructions which, when the program is executed by a control unit of a transportation vehicle, cause the control unit to predict channel load for a first transportation vehicle and selectively share the predicted communication channel load with other transportation vehicles by:

predicting a geographic area as a critical area having predicted channel congestion of at least one communication channel based on determining a number of transportation vehicles in the area during a certain time window;

determining propagation trajectory information of at least one second transportation vehicle;

comparing the propagation trajectory information of the at least one second transportation vehicle to the critical area to predict proximity of the at least one second transportation vehicle to the critical area within the time window; and selectively transmitting a message comprising information about the critical area to the at least one second transportation vehicle based on the comparison so as to inform only transportation vehicles that drive approach the predicted critical area during the time window about the predicted channel congestion.

22. The transportation vehicle of claim 21, wherein the predicted channel congestion of the at least one communication channel corresponds to channel quality information (CQI) below a predetermined first threshold and/or a channel load above a predetermined second threshold.

23. The non-transitory computer readable medium of claim 22, wherein the predicted channel congestion of the at least one communication channel corresponds to channel quality information (CQI) below a predetermined first threshold and/or a channel load above a predetermined second threshold.

24. The non-transitory computer readable medium of claim 22, wherein the predicting of the critical area comprises determining the geographic area as a high density area containing more than a predetermined number of transportation vehicles.

25. The non-transitory computer readable medium of claim 22, wherein the prediction of a geographic area as a critical area includes using a continuity equation to take into consideration a total number of transportation vehicles associated with the geographic area and time window based on an inflow and an outflow of transportation vehicles.

26. The non-transitory computer readable medium of claim 22, wherein the propagation trajectory information is obtained via sensor readings of the first transportation vehicle.

27. The non-transitory computer readable medium of claim 26, wherein the propagation trajectory information includes velocities and propagation directions of second transportation vehicles for use in determining traffic flow data associated with the second transportation vehicles.

28. The transportation vehicle of claim 21, wherein the predicting of the critical area comprises determining the geographic area as a high density area containing more than a predetermined number of transportation vehicles.

\* \* \* \* \*